(12) United States Patent
    Kato

(10) Patent No.: US 12,665,454 B2
(45) Date of Patent: Jun. 23, 2026

(54) ROTOR OF ROTARY ELECTRIC MACHINE AND METHOD FOR MANUFACTURING ROTOR

(71) Applicant: DENSO CORPORATION, Kariya-city (JP)

(72) Inventor: Hidenori Kato, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 173 days.

(21) Appl. No.: 18/439,429

(22) Filed: Feb. 12, 2024

(65) Prior Publication Data
    US 2024/0186849 A1      Jun. 6, 2024

Related U.S. Application Data

(63) Continuation of application No. PCT/JP2022/029651, filed on Aug. 2, 2022.

(30) Foreign Application Priority Data

Aug. 18, 2021    (JP) ................................. 2021-133273

(51) Int. Cl.
    *H02K 1/276*        (2022.01)
    *H02K 15/03*        (2025.01)
    *H02K 15/12*        (2006.01)
(52) U.S. Cl.
    CPC ............. *H02K 1/276* (2013.01); *H02K 15/03* (2013.01); *H02K 15/12* (2013.01); *H02K 2215/00* (2021.08)

(58) Field of Classification Search
    CPC ........ H02K 1/276; H02K 15/03; H02K 15/12; H02K 2215/00; Y02T 10/64
    See application file for complete search history.

(56) References Cited

U.S. PATENT DOCUMENTS

| | | | |
|---|---|---|---|
| 2012/0200193 A1 | 8/2012 | Sano et al. | |
| 2013/0334910 A1 | 12/2013 | Takahashi et al. | |

(Continued)

FOREIGN PATENT DOCUMENTS

| | | | | |
|---|---|---|---|---|
| JP | 2012-223009 A | 11/2012 | | |
| JP | 2013258849 A | * 12/2013 | ............. | H02K 15/03 |
| JP | 5447418 B2 | * 3/2014 | ........... | H02K 1/2766 |

(Continued)

*Primary Examiner* — Mohamad A Musleh
(74) *Attorney, Agent, or Firm* — Precision Patents, P.C.

(57) ABSTRACT

A rotor includes a rotor core and a plurality of magnets accommodated in each accommodation hole of the rotor core. The rotor core has a radial core thickness that is different on one side and the other side in a radial direction with the accommodation hole in between. The accommodation hole is formed surrounded by first side surfaces facing each other in a radial direction and second side surfaces facing each other in a circumferential direction. The magnet consists of two divided magnets arranged in the circumferential direction within the accommodation hole. The two divided magnets are biased in the radial direction so as to be close to the first side surface on a side having a thicker radial core thickness among both radial sides of the accommodation hole, and are biased so as to be close to the second side surface in the circumferential direction.

4 Claims, 8 Drawing Sheets

(56) References Cited

U.S. PATENT DOCUMENTS

2015/0115751 A1 * 4/2015 Horii ........................ H02K 1/32
310/54
2019/0288572 A1 * 9/2019 Takahashi .............. H02K 7/003

FOREIGN PATENT DOCUMENTS

JP          2015-119564 A      6/2015
JP          2016-039676 A      3/2016
JP          2019-140847 A      8/2019
JP          2021-013278 A      2/2021
JP          2021083221 A   *  5/2021

* cited by examiner

ROTOR OF ROTARY ELECTRIC MACHINE AND METHOD FOR MANUFACTURING ROTOR

CROSS-REFERENCE TO RELATED APPLICATIONS

This application is a continuation application of International Patent Application No. PCT/JP2022/029651 filed on Aug. 2, 2022, which designated the U.S. and based on and claims the benefits of priority of Japanese Patent Application No. 2021-133273 filed on Aug. 18, 2021. The entire disclosure of all of the above applications is incorporated herein by reference.

TECHNICAL FIELD

The disclosure in this specification relates to a rotor of a rotary electric machine and a method for manufacturing the rotor.

BACKGROUND

In a configuration having an embedded magnet type rotor (IPM rotor) as a rotating electric machine, it is conceivable that a fixed position of a permanent magnet varies within an accommodation hole for the permanent magnet.

SUMMARY

An object of the present disclosure is to provide a rotor for a rotary electric machine, and a method for manufacturing the rotor that can properly fix magnets in an accommodation hole of a rotor core.

As for a first means, a rotor of a rotary electric machine includes a rotor core made of a soft magnetic material, and a plurality of magnets each housed in a plurality of accommodation holes provided at predetermined intervals in a circumferential direction in the rotor core. The magnets are fixed by a filler filled in the accommodation hole. The rotor core has a radial core thickness that is different on one side and the other side in a radial direction with the accommodation hole in between. The accommodation hole is formed surrounded by first side surfaces facing each other in a radial direction and second side surfaces facing each other in a circumferential direction. The magnet is composed of two divided magnets arranged in the circumferential direction within the accommodation hole. The two divided magnets are biased in the radial direction so as to be close to the first side surface on a side having a thicker radial core thickness among both radial sides of the accommodation hole, and are biased so as to be close to the second side surface in the circumferential direction. In the accommodation hole, the filler is filled in a spaced apart region between the divided magnets and the rotor core, which is formed by biasing each of the divided magnets in the radial and circumferential directions.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
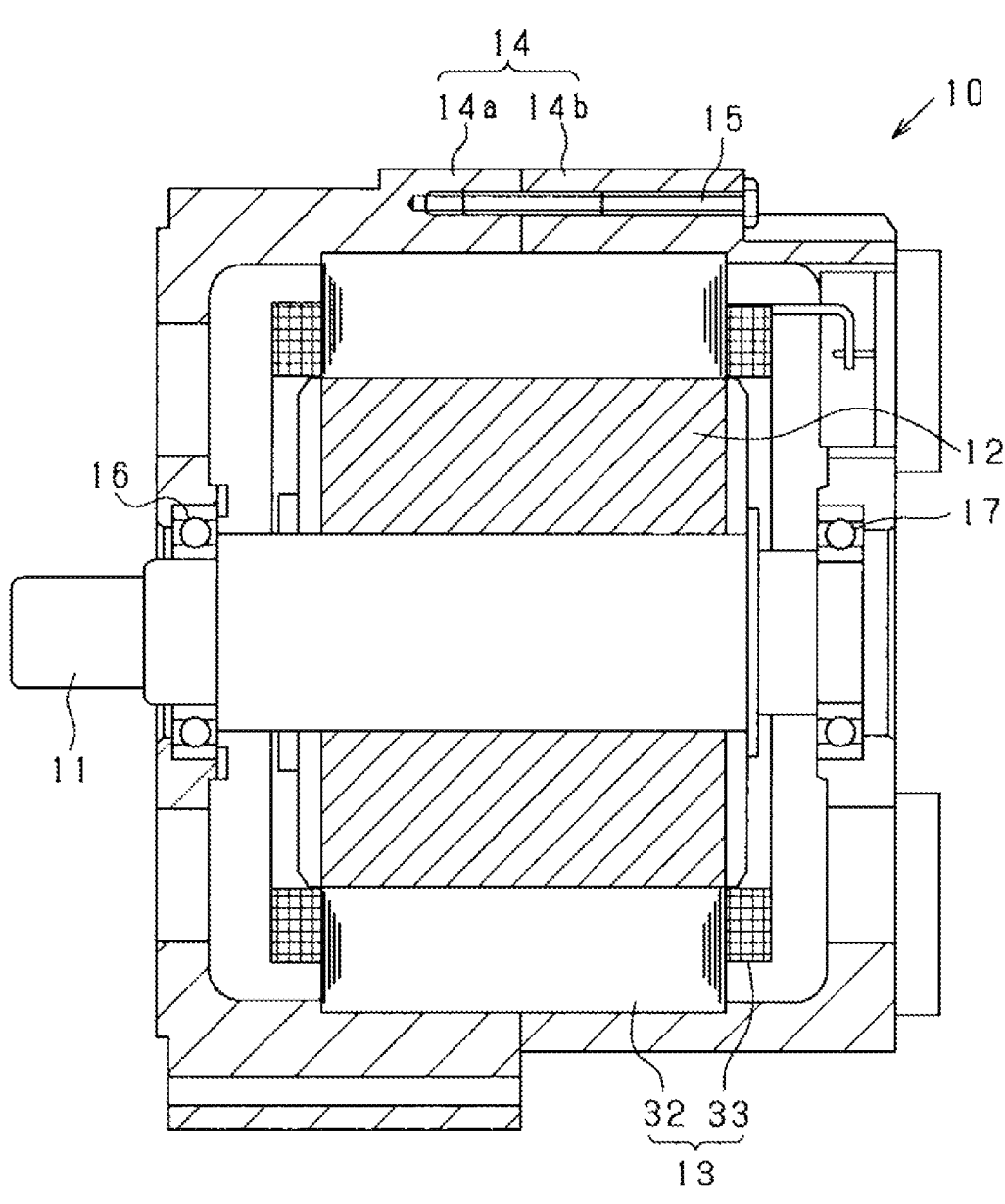
FIG. 1 is a longitudinal sectional view of a rotary electric machine.

In an assumable example having an embedded magnet type rotor (IPM rotor) as a rotating electric machine, it is conceivable that a fixed position of the permanent magnet varies within an accommodation hole for the permanent magnet. In this case, due to variations in the fixed positions of the permanent magnets, an unbalanced rotation of a rotor, an increase in torque ripple, a decrease in induced voltage, etc. may occur, and there is a concern that motor characteristics may deteriorate.

Therefore, in order to eliminate these inconveniences, in a technology of first and second surfaces facing each other in the permanent magnet, the first surface and a rotor core are bonded and fixed via a foaming adhesive that foams and hardens when heated, and on the other hand, the second surface and the rotor core are bonded and fixed via a thermosetting adhesive that does not foam when heated. According to this configuration, the position of the permanent magnet within the magnet accommodation hole can be made constant according to a foaming ratio of the foaming adhesive.

However, in the technique mentioned above, as a means for fixing the permanent magnet in the magnet accommodation hole, it is necessary to prepare two types of adhesives: a foaming adhesive that foams and hardens when heated, and a thermosetting adhesive that does not foam when heated. Therefore, there is a concern that the work of fixing the permanent magnet within the magnet accommodation hole will become complicated.

The present disclosure has been made in view of the above circumstances, and an object of the present disclosure is to provide a rotor for a rotary electric machine, and a method for manufacturing the rotor that can properly fix magnets in an accommodation hole of a rotor core.

The disclosed aspects in this specification adopt different technical solutions from each other in order to achieve their respective objectives. The objects, features, and advantages disclosed in this specification will become apparent by referring to following detailed descriptions and accompanying drawings.

As for a first means, a rotor of a rotary electric machine includes a rotor core made of a soft magnetic material, and a plurality of magnets each housed in a plurality of accommodation holes provided at predetermined intervals in a circumferential direction in the rotor core. The magnets are fixed by a filler filled in the accommodation hole. The rotor core has a radial core thickness that is different on one side and the other side in a radial direction with the accommodation hole in between. The accommodation hole is formed surrounded by first side surfaces facing each other in a radial direction and second side surfaces facing each other in a circumferential direction. The magnet is composed of two divided magnets arranged in the circumferential direction within the accommodation hole. The two divided magnets are biased in the radial direction so as to be close to the first side surface on a side having a thicker radial core thickness among both radial sides of the accommodation hole, and are biased so as to be close to the second side surface in the circumferential direction. In the accommodation hole, the filler is filled in a spaced apart region between the divided magnets and the rotor core, which is formed by biasing each of the divided magnets in the radial and circumferential directions.

In the rotor configured as described above, two divided magnets arranged in the circumferential direction are housed in the accommodation hole of the rotor core. Further, in the rotor core, the core thickness is different on one side in the radial direction and on the other side in the radial direction with the accommodation hole in between. In this case, the positional variation of each of the divided magnets within the accommodation hole is suppressed by the magnetic force of the magnet itself. Specifically, in the rotor core, since the core thickness is different between the inner and outer sides in the radial direction across the accommodation hole, each of the divided magnets is arranged so as to be close to the first side surface on the side where the core thickness is thicker in the radial direction. Moreover, since mutual magnetic repulsion is generated between the divided magnets in the accommodation hole, each of the divided magnets is biased so as to be close to the second side surface on opposite sides in the circumferential direction. In addition, by filling the accommodation hole with a filler, each of the divided magnets is maintained in a biased state. In the present disclosure, the positional variations of the divided magnets are suppressed by using the magnetic force of the magnets themselves, so the complexity during manufacturing is suppressed compared to, for example, a configuration using multiple types of adhesives. Thereby, the magnet can be properly fixed within the accommodation hole of the rotor core.

As for a second means, in the first means, each of the divided magnets is divided into two in the axial direction, and the divided magnets arranged in the axial direction are spaced apart from each other in the accommodation hole, and the filler is fitted in the spaced apart region.

In a configuration in which each of the divided magnets is divided into two in the axial direction, a mutual magnetic repulsion is generated between the magnets divided in the axial direction. Therefore, it is possible to suppress positional variations of the divided magnets in the axial direction as well as in the radial and circumferential directions within the accommodation hole of the rotor core.

As for a third means, in the first or second means, in the two divided magnets, a radial thickness dimension on a d-axis side, which is a magnetic pole center, is larger than a radial thickness dimension on a q-axis side, which is a magnetic pole boundary.

Since each of the divided magnets in the accommodation hole has a larger radial thickness on the d-axis side than on the q-axis side, it is possible to increase the magnetic repulsion force in the circumferential direction between the divided magnets and to suppress positional variations in the circumferential direction more appropriately. Further, according to the above configuration, it is possible to expect the effect of strengthening the magnetic flux on the d-axis at each magnetic pole of the rotor.

As for a fourth means, in a method for manufacturing a rotor that includes a rotor core made of a soft magnetic material, and a plurality of magnets respectively accommodated in a plurality of accommodation holes provided at predetermined intervals in a circumferential direction in the rotor core, wherein the rotor core has a radial core thickness that is different on one side and the other side in a radial direction with the accommodation hole in between, and the accommodation hole is formed surrounded by first side surfaces facing each other in the radial direction and second side surfaces facing each other in the circumferential direction, the method for manufacturing the rotor includes an inserting step of filling the accommodation hole with a filler in a non-hardened state, and inserting two divided magnets as a magnet in a state lined up in the circumferential direction within the accommodation hole, after the inserting step, a biasing step of biasing each of the divided magnets so as to be close to the first side surface on the side with a thicker core thickness in the radial direction among both radial sides of the accommodation hole, and biasing each of the divided magnets so as to be close to the second side surface in the circumferential direction, due to the magnetic force of each of the divided magnets, and after the biasing step, a fixing step of curing the filler in the accommodation hole to fix each of the divided magnets.

According to the above manufacturing method, in a state in which the non-hardened filler is filled in the accommodation hole and the two divided magnets aligned in the circumferential direction are inserted, a biasing arrangement is performed by the magnetic force of each of the divided magnets. In this case, each of the divided magnets is biased by the magnetic force of the magnet itself so as to be close to the first side surface on a side where the radial core thickness is thicker on both radial sides of the accommodation hole. Moreover, since mutual magnetic repulsion is generated between the divided magnets, each of the divided magnets is biased so as to be close to the second side surface opposite to each other in the circumferential direction. Then, after each of the divided magnets is biased on one side, the filler is hardened to fix each of the divided magnets. In this case, the positional variation of each of the divided magnets within the accommodation hole is suppressed by the magnetic force of the magnet itself. In the present manufacturing method, the positional variations of the divided magnets are suppressed by using the magnetic force of the magnets themselves, so the complexity during manufacturing is suppressed compared to, for example, a method using multiple types of adhesives. As a result, the magnet can be properly fixed within the accommodation hole of the rotor core.

As for a fifth means, in the fourth means, in the inserting step, each of the divided magnets in a non-magnetized state is inserted into the accommodation hole. In the biasing step, each of the divided magnets in a non-magnetized state in the accommodation hole is magnetized using a magnetizing device, and a magnetic force of the magnet after magnetization causes each of the divided magnets to be biased in the radial direction and circumferential direction in the accommodation hole.

In the biasing step, each of the divided magnets in a non-magnetized state in the accommodation hole is magnetized using a magnetizing device, and a magnetic force of the magnet after magnetization causes each of the divided magnets to be biased in the radial direction and circumferential direction in the accommodation hole. In this case, by continuously magnetizing and positioning each of the divided magnets, the rotor can be manufactured efficiently.

As for a sixth means, in the fourth or fifth means, in the inserting step, the divided magnets, which are divided into two in the circumferential direction and the axial direction, is inserted into the accommodation hole as the magnet. In the biasing step, each of the divided magnets is biased in the radial direction and circumferential direction in the accommodation hole by the magnetic force of each of the divided magnets, and each of the divided magnets arranged in the axial direction is arranged to be spaced apart from each other.

In the biasing process, the axial positioning of each of the divided magnets is performed using the magnetic repulsion between the magnets that are divided into two in the axial direction. Therefore, it is possible to suppress positional variations of the divided magnets in the axial direction as well as in the radial and circumferential directions within the accommodation hole of the rotor core.

As for a seventh means, in a method for manufacturing a rotor that includes a rotor core made of a soft magnetic material, and a plurality of magnets respectively accommodated in a plurality of accommodation holes provided at predetermined intervals in a circumferential direction in the rotor core, wherein the rotor core has a radial core thickness that is different on one side and the other side in a radial direction with the accommodation hole in between, and the accommodation hole is formed surrounded by first side surfaces facing each other in the radial direction and second side surfaces facing each other in the circumferential direction, the method for manufacturing the rotor includes an inserting step of filling the accommodation hole with a filler in a non-hardened state and inserting the magnet within the accommodation hole, after the inserting step, a biasing step of biasing each of the divided magnets so as to be close to the first side surface on the side with a thicker core thickness in the radial direction among both radial sides of the accommodation hole due to the magnetic force of each of the divided magnets, and biasing the magnet so as to be close to one of the second side surfaces on both sides in the circumferential direction by an external magnetic force directed toward one side in the circumferential direction; and after the biasing step, a fixing step of curing the filler in the accommodation hole to fix the magnet.

According to the above-described manufacturing method, the biasing arrangement of the magnets is performed while the unhardened filler is filled and the magnets are inserted in the accommodation hole. In this case, the magnets are biased by the magnetic force of the magnet itself so as to be close to the first side surface on a side where the radial core thickness is thicker on both radial sides of the accommodation hole. Further, by applying an external magnetic force directed toward one side in the circumferential direction to the magnet in the accommodation hole, the magnet is biased toward one side of the second side surfaces on both sides of the accommodation hole in the circumferential direction. Then, after the magnets are biased on one side, the filler is hardened to fix the magnets. In this case, the positional variation of the magnet within the accommodation hole is suppressed by the magnetic force of the magnet itself. In the present manufacturing method, the positional variations of the magnets are suppressed by using the magnetic force of the magnets themselves and the external magnetic force, so the complexity during manufacturing is suppressed compared to, for example, a method using multiple types of adhesives. As a result, the magnet can be properly fixed within the accommodation hole of the rotor core.

As for an eighth means, in the seventh means, in the inserting step, the magnet in a non-magnetized state is inserted into the accommodation hole. In the biasing step, the unmagnetized magnet in the accommodation hole is magnetized using a magnetizing device that generates a magnetizing magnetic field. Using a biasing magnetic force device that generates an external magnetic force directed toward one side in the circumferential direction, the magnet is biased so as to be close to one side of the second side surfaces on both sides of the accommodation hole in the circumferential direction.

In the biasing step, the non-magnetized magnet inserted into the accommodation hole is magnetized by the magnetizing device, and the external magnetic force of the biasing magnetic device causes the magnet to bias toward one side of the second side surfaces on both sides of the accommodation hole in the circumferential direction. In this case, by continuously magnetizing and positioning the magnet, the rotor can be manufactured efficiently.

As for a ninth means, a rotor of a rotary electric machine includes a rotor core made of a soft magnetic material, and a plurality of magnets respectively accommodated in a plurality of accommodation holes provided at predetermined intervals in a circumferential direction in the rotor core. The rotor core has a radial core thickness that is different on one side and the other side in a radial direction with the accommodation hole in between. The accommodation hole is formed surrounded by first side surfaces facing each other in the radial direction and second side surfaces facing each other in the circumferential direction. The magnet is composed of two divided magnets arranged in the circumferential direction within the accommodation hole. The two divided magnets are biased in the radial direction so as to be close to the first side surface on a side having a thicker radial core thickness among both radial sides of the accommodation hole, and are biased so as to be close to the second side surface in the circumferential direction.

In the rotor having the above configuration, since the core thickness is different between the inner and outer sides in the radial direction across the accommodation hole in the rotor core, each of the divided magnets is arranged so as to be close to the first side surface on the side where the core thickness is thicker in the radial direction. Moreover, since mutual magnetic repulsion is generated between the divided magnets in the accommodation hole, each of the divided magnets is biased so as to be close to the second side surface on opposite sides in the circumferential direction. In the present disclosure, the positional variations of the divided magnets are suppressed by using the magnetic force of the magnets themselves, so the complexity during manufacturing is suppressed compared to, for example, a configuration using multiple types of adhesives. As a result, the magnet can be properly fixed within the accommodation hole of the rotor core.

Embodiments will be described below with reference to the drawings. The rotary electric machine in the present embodiment is used, for example, as a vehicle-mounted electric device. However, the rotary electric machine may be widely used for industrial purposes, ships, aircraft, home appliances, OA equipment, game machines, and the like. Among the following embodiments, the same or equivalent parts are denoted by the same reference numerals in the drawings, and their descriptions will be referred to for the parts of the same reference numerals.

First Embodiment

Figure 2:
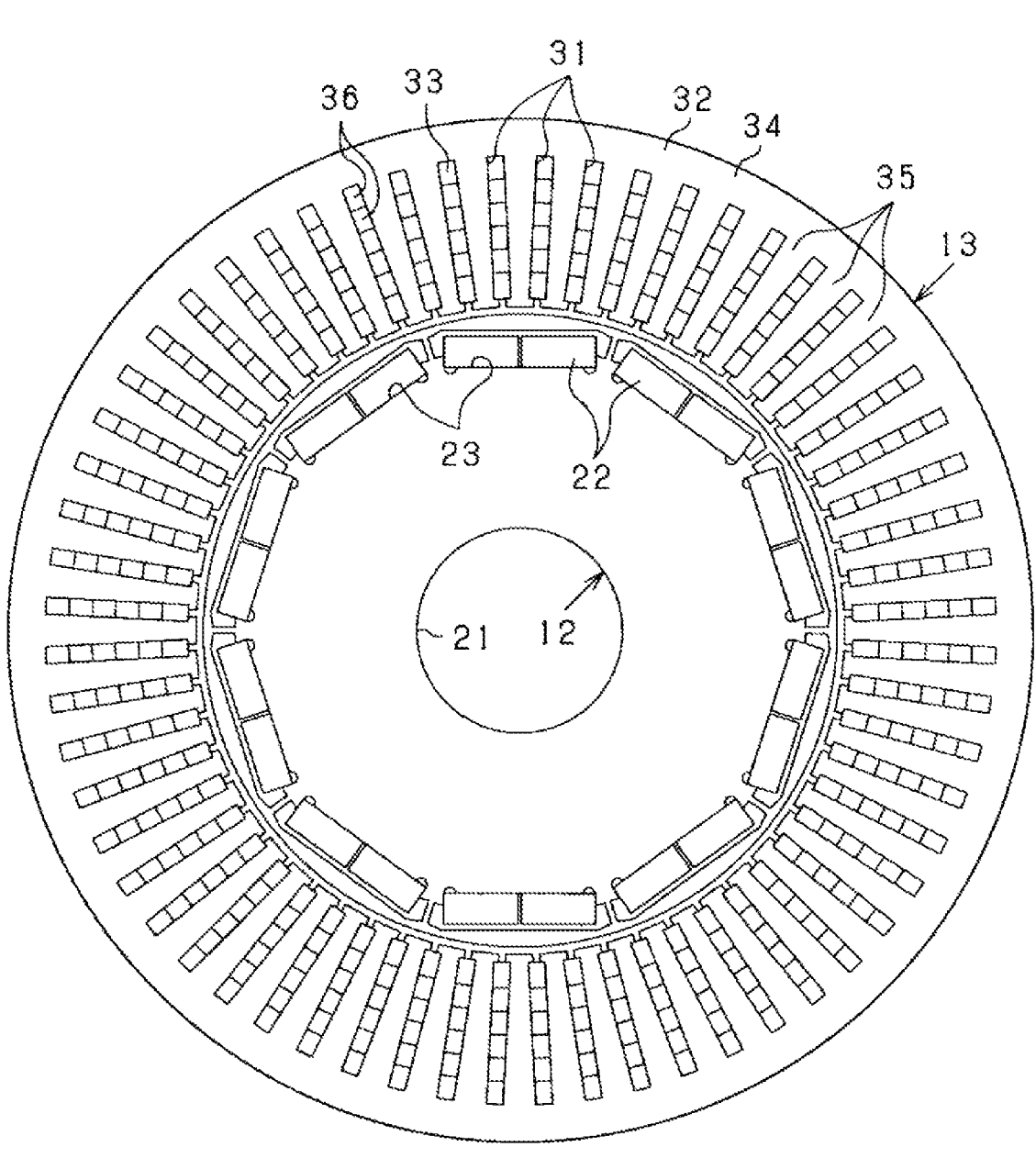
FIG. 2 is a cross-sectional view showing a rotor and a stator.

The rotary electric machine 10 according to the present embodiment is an inner rotor type (internal rotation type) multiphase AC motor, and its outline is shown in FIGS. 1 and 2. FIG. 1 is a vertical cross-sectional view of the rotary electric machine 10 in a direction along a rotating shaft 11, and FIG. 2 is a cross-sectional view of a rotor 12 and a stator 13 in a direction perpendicular to the rotating shaft 11. In the following description, a direction in which the rotating shaft 11 extends is referred to as an axial direction, a direction extending radially around the rotating shaft 11 is referred to as a radial direction, and a direction extending circumferentially around the rotating shaft 11 is referred to as a circumferential direction.

The rotary electric machine 10 includes the rotor 12 fixed to the rotating shaft 11, a stator 13 provided at a position surrounding the rotor 12, and a housing 14 that accommodates the rotor 12 and stator 13. The rotor 12 and stator 13 are arranged coaxially. The housing 14 has a pair of bottomed cylindrical housing members 14a and 14b, and the housing members 14a and 14b are joined together at their openings and are integrated by fastening bolts 15. The housing 14 is provided with bearings 16 and 17, and the rotating shaft 11 and the rotor 12 are rotatably supported by the bearings 16 and 17.

As shown in FIG. 2, the rotor 12 is configured as an embedded magnet rotor (IPM rotor), and includes a rotor core 21 that rotates integrally with the rotating shaft 11, and a plurality of permanent magnets 22 held by the rotor core 21. The rotor core 21 is made of a soft magnetic material and is constructed by laminating a plurality of electromagnetic steel plates in the axial direction and fixing them by caulking or the like. A plurality of accommodation holes 23 are provided in the rotor core 21 at predetermined intervals in the circumferential direction, and each of the permanent magnets 22 is housed in each of the accommodation holes 23. Thereby, the permanent magnets 22 are arranged in the circumferential direction for each magnetic pole. In the present embodiment, the rotor 12 is provided with ten magnetic poles (five pole pairs) such that N poles and S poles are arranged alternately in the circumferential direction. However, the number of poles is arbitrary.

The stator 13 includes an annular stator core 32 having a plurality of slots 31 in the circumferential direction, and a three-phase (U-phase, V-phase, W-phase) stator winding 33 wound around each slot 31 of the stator core 32. The stator core 32 is constructed by laminating a plurality of annular electromagnetic steel plates in the axial direction and fixing them by caulking or the like. The stator core 32 includes an annular yoke 34 and a plurality of teeth 35 that protrude radially inward from the yoke 34 and are arranged at a predetermined distance in the circumferential direction, and a slot 31 is formed between adjacent teeth 35. The teeth 35 are provided at equal intervals in the circumferential direction.

The stator winding 33 is wound around each slot 31 so as to be wound around teeth 35. The stator winding 33 uses a conductive wire 36 made of a rectangular conductive wire, and the conductive wire 36 is configured such that its conducting wires 36 are accommodated in each slot 31 in a plurality of layers in the radial direction. More specifically, the stator winding 33 is configured by a plurality of conductor segments joined together. In the stator winding 33, the conductive wires 36 having the same phase and having a logarithm of 2 for each magnetic pole in the stator core 32 are arranged side by side in the circumferential direction.

By the way, the rotor core 21 of the rotor 12 is provided with the accommodation hole 23 larger in size than the permanent magnet 22 for reasons such as work convenience. When the permanent magnet 22 is housed in the accommodation hole 23, an extra gap is formed between an outer peripheral surface of the permanent magnet 22 and an inner wall of the accommodation hole 23. Therefore, there is a concern that the position of the permanent magnet 22 within the accommodation hole 23 may vary. Therefore, in the present embodiment, in the rotor 12, the variation in the position of the permanent magnet 22 within the accommodation hole 23 is suppressed by using the magnetic force of the magnet 22 itself. The detailed configuration will be explained below.

Figure 3A:
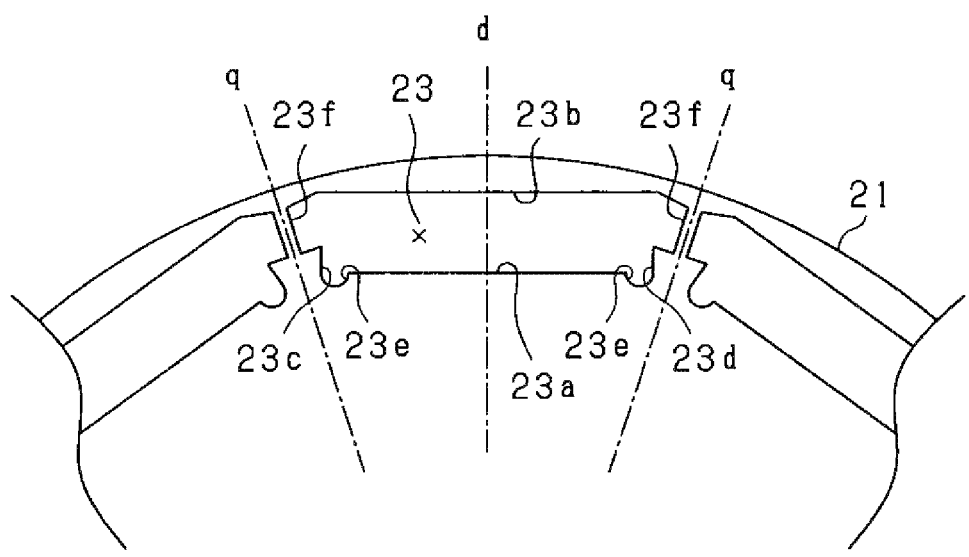
FIG. 3A is a cross-sectional view showing an enlarged configuration of a magnetic pole of the rotor.
Figure 3B:
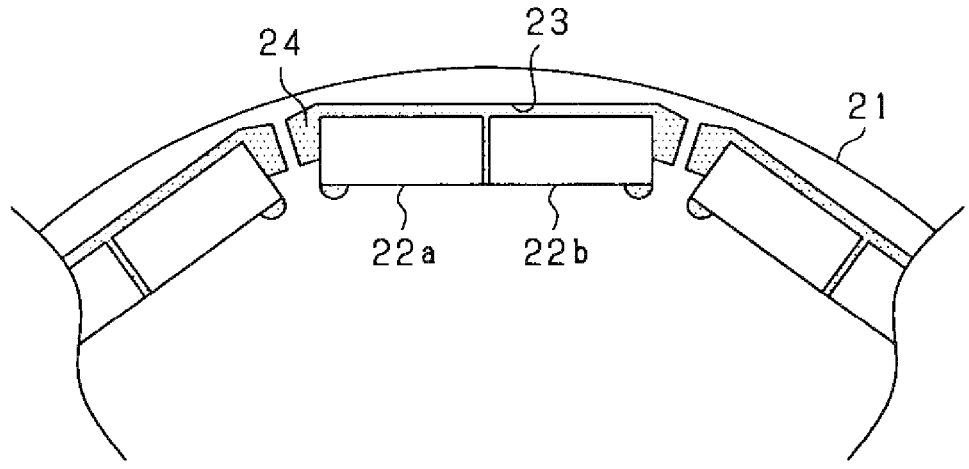
FIG. 3B is a cross-sectional view showing an enlarged configuration of a magnetic pole of the rotor.

FIGS. 3A and 3B are the enlarged cross-sectional views showing the configuration of the magnetic poles of the rotor 12, in which FIG. 3A shows the accommodation hole 23 in a state where the permanent magnet 22 is not housed, and FIG. 3B shows the accommodation hole 23 in a state where the permanent magnet 22 is housed.

As shown in FIG. 3A, in the rotor core 21, the accommodation hole 23 is formed for each magnetic pole so that the d-axis, which is the center of the magnetic pole, is a center in the circumferential direction, and extends linearly between the two q-axes, which is a boundary of the magnetic poles. The accommodation hole 23 extends in a direction perpendicular to the d-axis and is surrounded by a pair of first side surfaces 23a, 23b facing each other in the radial direction and a pair of second side surfaces 23c, 23d facing each other in the circumferential direction. A recessed portion 23e is respectively formed at both circumferential ends of the radially inner first side surface 23a of the pair of first side surfaces 23a, 23b. Further, a recessed portion 23f is respectively formed in the pair of second side surfaces 23c and 23d so as to bulge outward in the circumferential direction.

The accommodation hole 23 is provided near the outer circumference of the rotor core 21, and a core thickness in the radial direction is different on one side and the other side in the radial direction with the accommodation hole 23 in between. Specifically, the core thickness on the radially inner side is thicker than the core thickness on the radially outer side.

As shown in FIG. 3B, two divided magnets 22a and 22b are accommodated as permanent magnets 22 in the accommodation hole 23 in a state lined up in the circumferential direction, and each of these divided magnets 22a and 22b is fixed by a filler 24 filled in the accommodation hole 23. The filler 24 is, for example, an adhesive. The divided magnets 22a and 22b have a rectangular cross section, and a direction of magnetic field line inside the magnets is parallel or substantially parallel to the d-axis.

Figure 4:
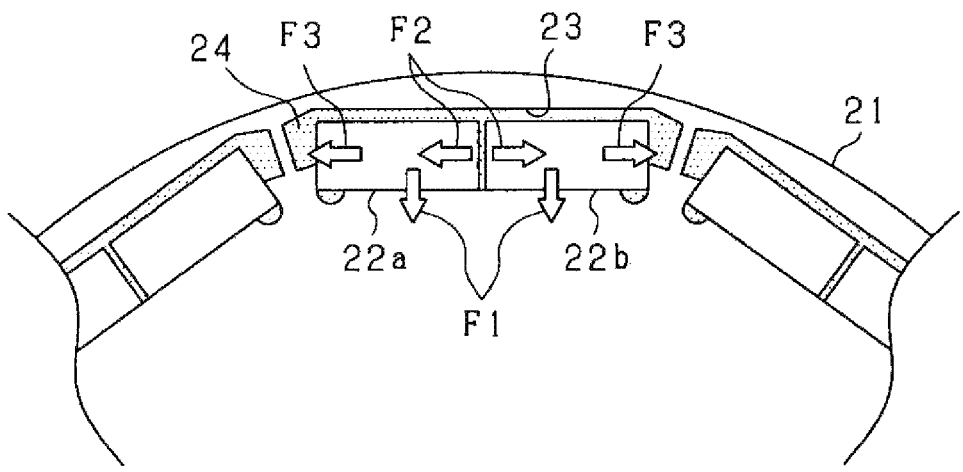
FIG. 4 is a diagram showing a magnetic attraction force and a magnetic repulsion force of each of divided magnets.

Here, in each of the divided magnets 22a and 22b housed in the accommodation hole 23, a force is generated in the direction shown by the arrows in FIG. 4, and the respective divided magnets 22a, 22b are positioned by this force. Specifically, the two divided magnets 22a and 22b are arranged in a state of being biased toward the first side surface 23a on the radially inner side of both radial sides of the accommodation hole 23 by a magnetic attraction force F1 generated radially inward. That is, the core thicknesses are different on both sides of the accommodation hole 23 in the radial direction, and the core thickness is thicker on the radially inner side, so that a strong magnetic attraction force F1 is generated radially inward. Thereby, each of the divided magnets 22a, 22b is arranged so as to be close to the thicker core side, that is, the first side surface 23a on the radially inner side.

Moreover, the two divided magnets 22a and 22b are arranged in a state of being biased toward the second side surfaces 23c and 23d, respectively, due to a magnetic repulsion force F2 and a magnetic attraction force F3 generated in the circumferential direction. That is, in the rotor core 21, the divided magnets 22a, 22b of the same polarity are housed in one accommodation hole 23, and the divided magnets 22a, 22b of different polarity are accommodated in each circumferentially adjacent accommodation hole 23. For example, when the central magnetic pole in FIG. 3B is a N pole, the polarities of the magnetic poles on both sides thereof are S poles. In this case, near the d-axis, a magnetic repulsion force F2 is generated between the divided magnets 22a and 22b in the circumferential direction. On the other hand, near the q-axis, a magnetic attraction force F3 is generated in the circumferential direction between the divided magnets 22a and 22b of adjacent magnetic poles. As a result, the divided magnet 22a on the left side of the figure is biased so as to be close to the second side surface 23c on the left side, and the divided magnet 22b on the right side of the figure is biased so as to be close to the second side surface 23d on the right side. Each of the divided magnets 22a, 22b may be in contact with the first side surface 23a or the second side surface 23c, 23d.

Then, in the accommodation hole 23, a filler 24 is filled in a region formed by biasing the divided magnets 22a and 22b in the radial and circumferential directions, that is, the spaced apart region between the permanent magnet 22 and the rotor core 21.

Figure 5:
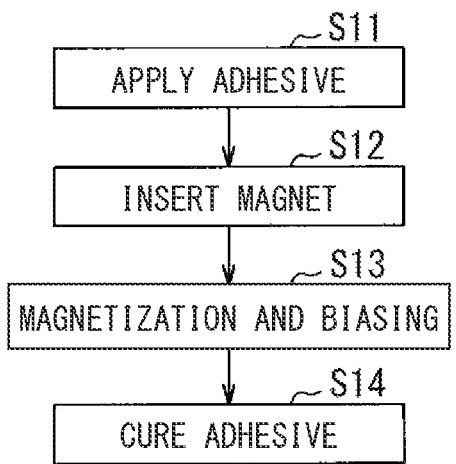
FIG. 5 is a flowchart showing a manufacturing process of the rotor.

Next, a method for manufacturing the rotor 12 will be explained. FIG. 5 is a flowchart showing the manufacturing process of the rotor 12.

During the manufacture of the rotor 12, in a first step S11, the adhesive in a non-hardened state (flexible state before hardening) is applied as a filler 24 to either the divided magnets 22a, 22b or the accommodation hole 23 of the rotor core 21. It is also possible to apply adhesive to both the divided magnets 22a, 22b and the accommodation hole 23 of the rotor core 21.

Furthermore, in a second step S12, the unmagnetized divided magnets 22a and 22b are inserted into the accommodation hole 23. The divided magnets 22a and 22b prepared at this point are non-magnetized magnets produced by synthesis, molding, sintering, etc. of magnet raw materials. Each of the divided magnets 22a and 22b is inserted in the accommodation hole 23 in a state in which they are lined up in the circumferential direction. The first step S11 and the second step S12 correspond to the "inserting step".

Figure 6:
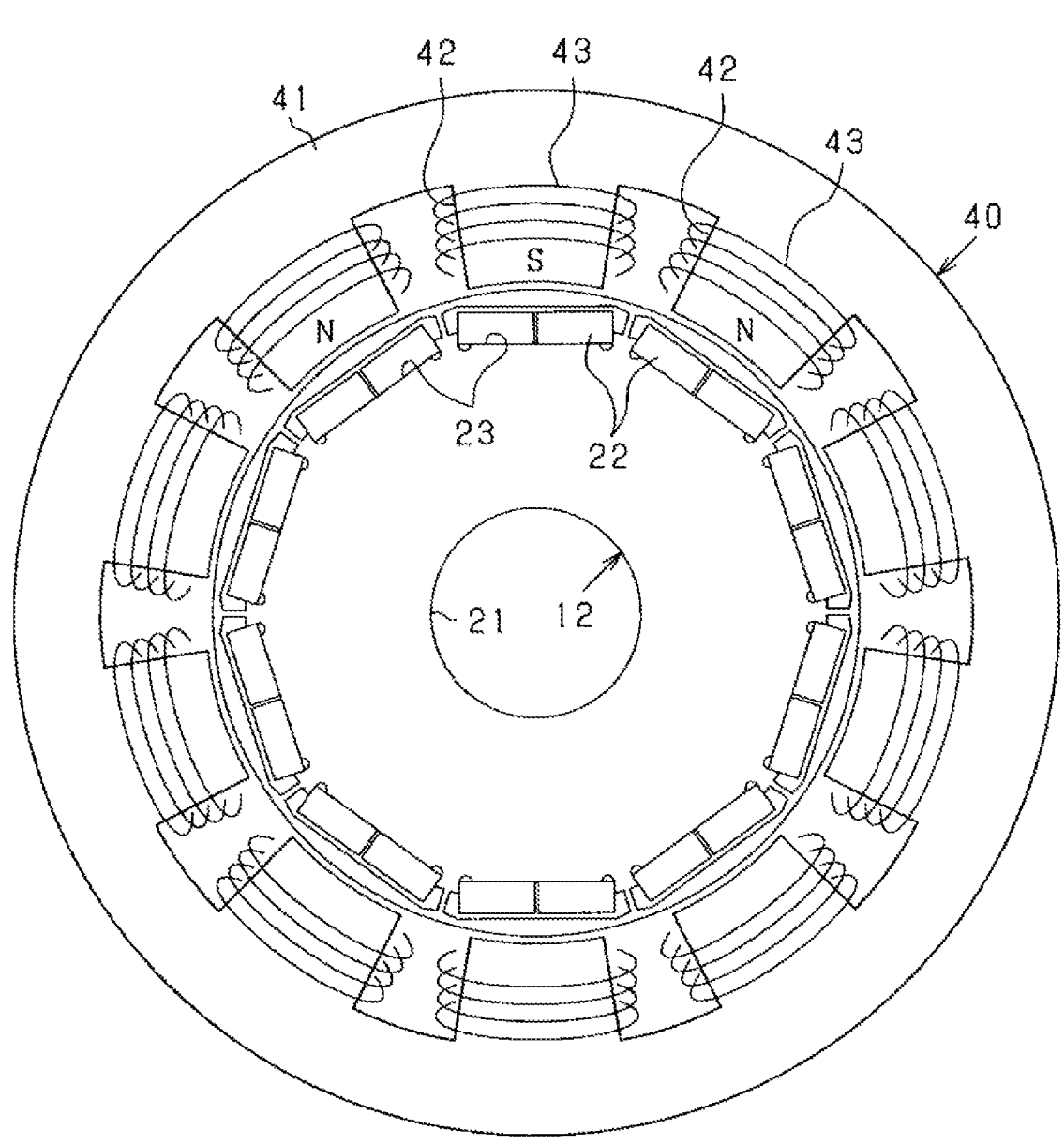
FIG. 6 is a diagram showing a magnetizing device and the rotor.

Thereafter, in a third step S13, a magnetization of the divided magnets 22a and 22b in the accommodation hole 23 and a biasing arrangement of the divided magnets 22a and 22b in the accommodation hole 23 are carried out. FIG. 6 is a diagram showing a magnetizing device 40 that magnetizes the divided magnets 22a and 22b. The magnetizing device 40 is a device that magnetizes the divided magnets 22a and 22b of each magnetic pole using an electromagnet, and includes a magnetizing yoke 41 having an annular shape and having a plurality of convex portions 42 on the inside in the radial direction, and a magnetizing coil 43 wound around each of the convex portions 42. The convex portions 42 of the magnetizing yoke 41 are provided in the same number as the number of magnetic poles of the rotor 12 and at the same pitch.

The rotor 12 is arranged inside the magnetizing yoke 41 in the radial direction. At this time, the rotor 12 is arranged so that the magnetic pole center (d-axis) of the rotor 12 and the circumferential center position of the convex portion 42 of the magnetizing yoke 41 coincide with each other. Then, when a current flows through each magnetizing coil 43 by energization of a power supply section (not shown), a magnetizing magnetic field is generated for each convex portion 42. As a result, each of the divided magnets 22a and 22b in the accommodation hole 23 is magnetized, and in the rotor 12, magnetic poles of different polarity are formed alternately in the circumferential direction.

Further, after each of the divided magnets 22a, 22b is magnetized, each of the divided magnets 22a, 22b is biased in the radial direction and circumferential direction in the accommodation hole 23 by the magnetic force of the divided magnets 22a, 22b itself. At this time, the adhesive in the accommodation hole 23 is in a non-hardened state, and each of the divided magnets 22a, 22b moves within the accommodation hole 23 due to the magnetic force of the magnet itself. Specifically, as explained in FIG. 4, each of the divided magnets 22a, 22b is biased toward the radially inner first side surface 23a by the radially inward magnetic attraction force F1. Further, due to the magnetic repulsion force F2 and magnetic attraction force F3 in the circumferential direction, each of the divided magnets 22a, 22b is biased toward the second side surface 23c, 23d, respectively.

When each of the divided magnets 22a, 22b is shifted to one side in the accommodation hole 23, the adhesive between each of the divided magnets 22a, 22b and the radially inner first side surface 23a is pushed out, and each of the divided magnets 22a, 22b and the first side surface 23a are brought into close proximity. Further, the adhesive between each of the divided magnets 22a, 22b and each second side surface 23c, 23d is pushed out, and each of the divided magnets 22a, 22b and each second side surface 23c, 23d are brought into close proximity. The third step S13 corresponds to a "biasing step".

Thereafter, in a fourth step S14, the adhesive in the accommodation hole 23 is cured to fix each of the divided magnets 22a, 22b. As a result, the divided magnets 22a and 22b are fixed at the same position in each of the accommodation holes 23 arranged in the circumferential direction. The fourth step S14 corresponds to a "fixing step".

According to the present embodiment described in detail above, the following excellent effects can be obtained.

In the rotor 12 with the above configuration, the positional variations of the divided magnets 22a and 22b are suppressed by using the magnetic force of the magnets themselves, so the complexity during manufacturing is suppressed compared to, for example, a configuration using multiple types of adhesives. Thereby, the permanent magnet 22 can be properly fixed within the accommodation hole 23 of the rotor core 21. By suppressing variations in the magnet positions, deterioration in the characteristics of the rotary electric machine 10 can be suppressed.

Moreover, according to the above manufacturing method, the rotor 12 with no variation in the position of the permanent magnets 22 can be suitably manufactured by determining the magnet position using the magnetic force of the magnet itself. Further, by continuously magnetizing and positioning each of the divided magnets 22a, 22b, the rotor 12 can be manufactured efficiently.

It is also possible to adopt the following configurations as a modification of the first embodiment.

Figure 7:
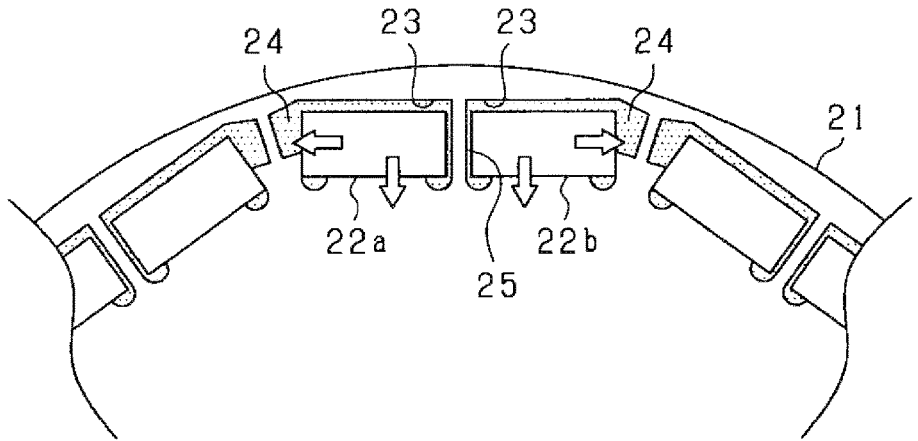
FIG. 7 is a diagram showing a modification of the first embodiment.

As shown in FIG. 7, the rotor core 21 may be provided with a connecting portion 25 extending in the radial direction at the circumferential center position (d-axis position) of the accommodation hole 23 in each magnetic pole. That is, the accommodation hole 23 of each magnetic pole is divided into two holes in the circumferential direction by the connecting portion 25, and one of the divided magnets 22a, 22b is accommodated in each divided hole. In the present configuration, similarly to the above embodiment, the two divided magnets 22a and 22b are biased toward the first side surface 23a on the radially inner side by the magnetic attraction force generated in the radially inward direction, and are biased toward the second side surfaces 23c and 23d, respectively, by magnetic repulsion and magnetic attraction generated in the circumferential direction.

According to the configuration of FIG. 7, in addition to being able to suppress variations in the position of the magnets within the accommodation hole 23 as described above, by providing the connecting portion 25, the centrifugal strength of the rotor 12 can be improved.

Figure 8:
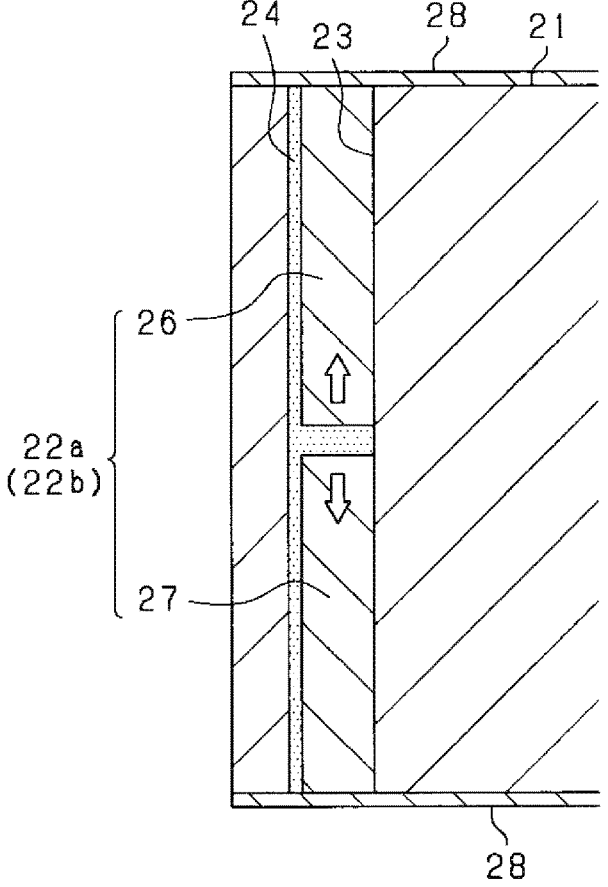
FIG. 8 is a diagram showing a modification of the first embodiment.

As shown in FIG. 8, each of the divided magnets 22a, 22b may be divided into two in the axial direction within the accommodation hole 23. In the rotor 12 shown in FIG. 8, the magnets 26 and 27 which are divided into upper and lower parts as divided magnets 22a and 22b are shown in the longitudinal section. In this case, the magnetic repulsion is generated in the axial direction between the magnets 26 and 27 arranged in the axial direction, so that the magnets 26 and 27 are spaced apart from each other in the axial direction. A filler 24 is filled in the spaced apart region. The total axial length of each of the divided magnets 22a, 22b (the sum of the lengths of the magnets 26, 27) is preferably shorter than the axial length of rotor core 21. The plates 28 that close an opening of the accommodation hole 23 is provided at both axial ends of the rotor core 21, and the plates 28 prevent the magnets 26 and 27 from protruding from the accommodation hole 23.

When manufacturing the rotor 12, in the second step S12 in FIG. 5, the divided magnets 22a and 22b, which are respectively divided into two in the circumferential direction and the axial direction, are inserted into the accommodation hole 23. That is, in this case, four magnet pieces are inserted into each accommodation hole 23. After that, in the third step S13, each of the divided magnets 22a, 22b is magnetized. After the magnetization, each of the divided magnets 22a, 22b is biased in the radial direction and circumferential direction in the accommodation hole 23 by the magnetic force of the magnet. The magnets 26 and 27 aligned in the axial direction are arranged so as to be spaced apart from each other. At this time, the plates 28 are attached to both ends of the rotor core 21 in the axial direction so as to close the opening of the accommodation hole 23, and in this state, each magnet 26, 27 may be brought into contact with the plate 28 by generating an axial magnetic repulsion force.

Thereafter, in the fourth step S14, the adhesive in the accommodation hole 23 is cured to fix each of the divided magnets 22a, 22b.

Instead of regulating the axial position of each magnet 26, 27 with the plate 28, it is also possible to regulate the axial position of each magnet 26, 27 with a working jig. In this case, the jig is preferably removed after the positions of the magnets 26 and 27 are determined as the adhesive hardens.

According to the above configuration, it is possible to suppress positional variations of the divided magnets 22a and 22b in the axial direction as well as in the radial and circumferential directions within the accommodation hole 23 of the rotor core 21.

Figure 9:
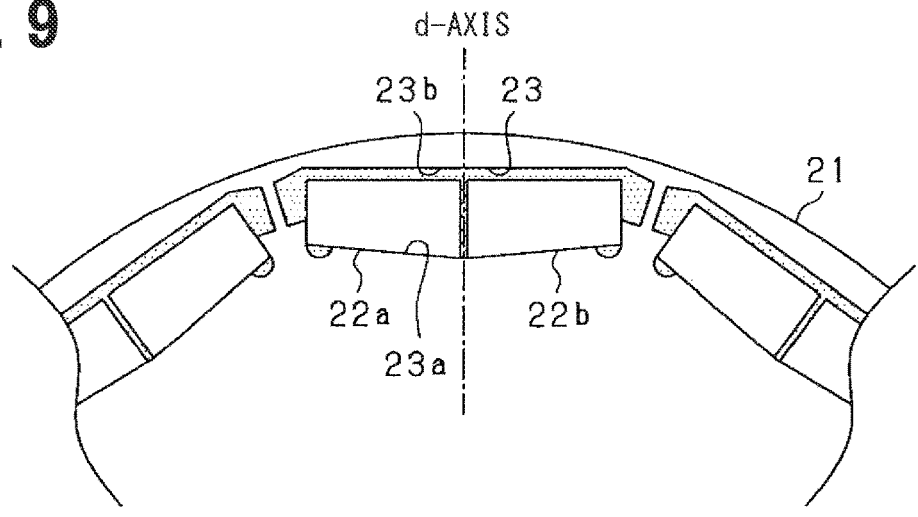
FIG. 9 is a diagram showing a modification of the first embodiment.

As shown in FIG. 9, in each of the divided magnets 22a and 22b, the radial thickness on the d-axis side may be larger than the radial thickness on the q-axis side. In the illustrated configuration, a radial inner side surface on both radial side surfaces of each of the divided magnets 22a, 22b is inclined obliquely with respect to the direction perpendicular to the d-axis, so that the radial thickness on the d-axis side becomes larger. Regarding the first side surfaces 23a and 23b of the accommodation hole 23, the first side surface 23b on the radially outer side is provided in a direction perpendicular to the d-axis, whereas the first side surface 23a on the radially inner side is symmetrical on both sides with the d-axis in between, and is provided obliquely with respect to the direction perpendicular to the d-axis.

In this case, the magnetic repulsion force in the circumferential direction between the divided magnets 22a and 22b can be increased, and positional variations in the circumferential direction can be suppressed more appropriately. Further, according to the above configuration, it is possible to expect the effect of strengthening the magnetic flux on the d-axis at each magnetic pole of the rotor 12.

It is also possible to use a resin material as the filler 24 instead of adhesive. In this case, in the first step S11 in FIG. 5, the unmagnetized divided magnets 22a and 22b are inserted into the accommodation hole 23. In the second step S12, a resin material in a non-hardened state (liquid state before hardening) is poured as a filler 24 into the gap in the accommodation hole 23 in which the divided magnets 22a and 22b are housed. Then, after the magnetization and the biasing arrangement are performed in the third step S13, in the fourth step S14, the resin material in the accommodation hole 23 is hardened to fix each of the divided magnets 22a, 22b.

The magnetizing device 40 may be one that generates a magnetizing magnetic field using a permanent magnet instead of one that generates a magnetizing magnetic field using an electromagnet.

In the above embodiment, in the second step S12 in FIG. 6, the divided magnets 22a, 22b in a non-magnetized state are inserted into the accommodation hole 23, and in the subsequent third step S13, the divided magnets 22a, 22b in the accommodation hole 23 are magnetized.

Instead of the above process, in the second step S12, the magnetized divided magnets 22a and 22b may be housed into the accommodation hole 23. In this case, in the third step S13, the divided magnets 22a and 22b are not magnetized, and only the biasing arrangement of each of the divided magnets 22a and 22b is performed.

An embodiment different from the first embodiment described above will be described below, focusing on the differences from the first embodiment.

Second Embodiment

Figure 10:
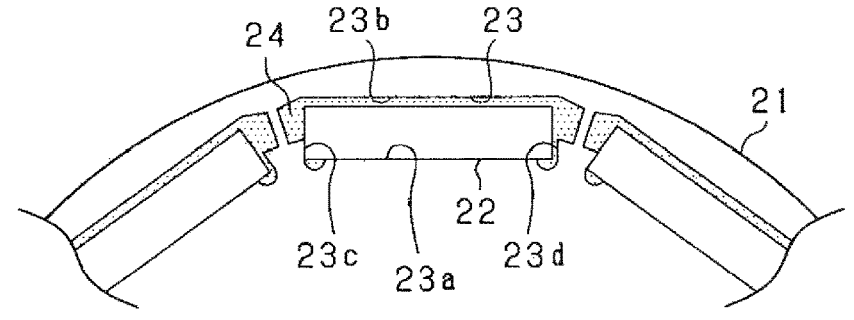
FIG. 10 is a cross-sectional view showing an enlarged configuration of a magnetic pole of a rotor in a second embodiment.

In the present embodiment, as a change from the first embodiment, a single permanent magnet 22 is accommodated in each accommodation hole 23 of the rotor core 21. FIG. 10 is a cross-sectional view showing an enlarged configuration of a magnetic pole of the rotor 12. The configuration of the accommodation hole 23 is the same as the configuration shown in FIGS. 3A and 3B, and the like.

In FIG. 10, a single permanent magnet 22 is housed in the accommodation hole 23, and the permanent magnet 22 is fixed by the filler 24. The filler 24 is, for example, an adhesive. However, the filler 24 may be a resin material. The permanent magnet 22 has a rectangular cross section, and a direction of magnetic field line inside the magnets is parallel or substantially parallel to the d-axis. The permanent magnet 22 is arranged in the accommodation hole 23 in a state of being biased so as to be close to a first side surface 23a on the radially inner side of both sides in the radial direction, and be close to a second side surface 23c on one side of both sides in the circumferential direction. The permanent magnet 22 may be in contact with the first side surface 23a or the second side surface 23c. Then, in the accommodation hole 23, a filler 24 is filled in a region formed by biasing the permanent magnet 22 in the radial and circumferential directions, that is, the spaced apart region between the permanent magnet 22 and the rotor core 21.

Figure 11:
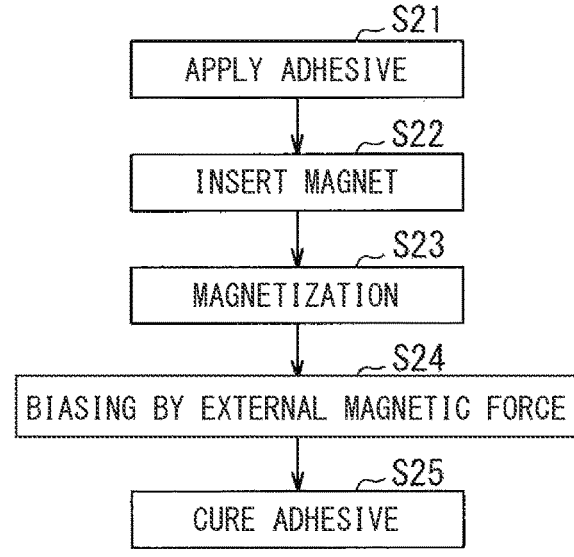
FIG. 11 is a flowchart showing a manufacturing process of the rotor.

Next, a method for manufacturing the rotor 12 will be explained. FIG. 11 is a flowchart showing the manufacturing process of the rotor 12.

When manufacturing the rotor 12, in a first step S21, a non-hardened state adhesive is applied as a filler 24 to either the permanent magnet 22 or the accommodation hole 23 of the rotor core 21. Furthermore, in a second step S22, the non-magnetized permanent magnet 22 is inserted into the accommodation hole 23. These steps S21 and S22 generally correspond to steps S11 and S12 in FIG. 5 described above, except that the configuration of the permanent magnet 22 is different.

Figure 12A:
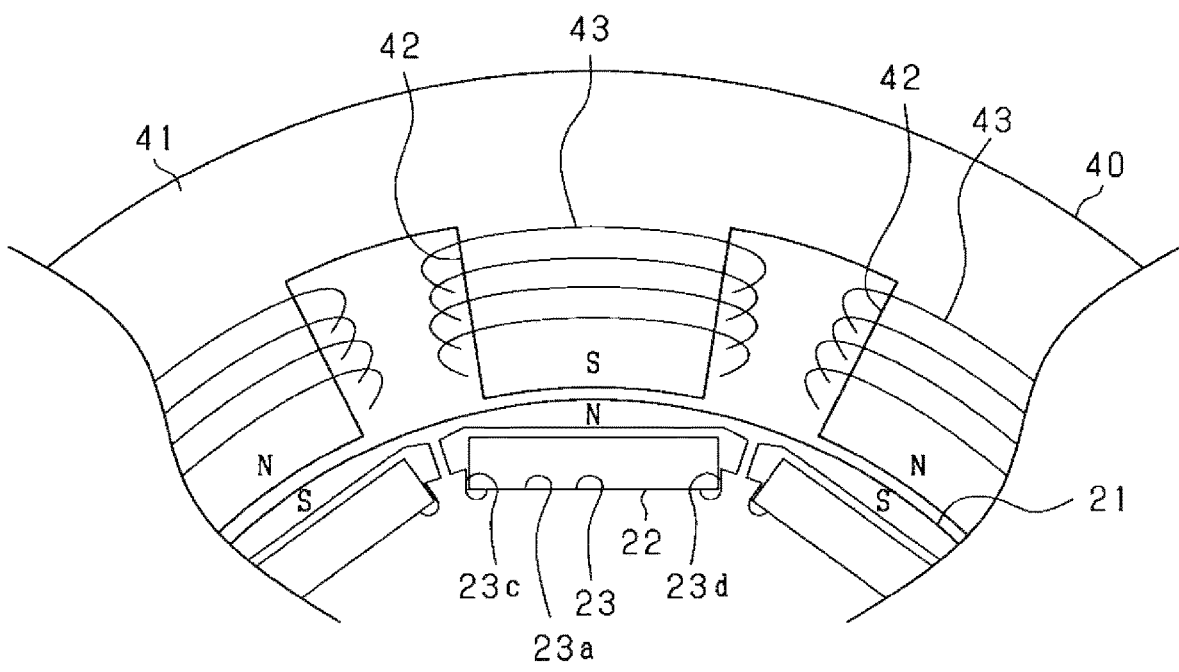
FIG. 12A is a diagram illustrating a magnetization and a biasing arrangement by a magnetizing device.

Thereafter, in a third step S23, the permanent magnet 22 in the accommodation hole 23 is magnetized using the magnetizing device 40 (see FIG. 6). At this time, as shown in FIG. 12A, the rotor 12 is arranged so that the magnetic pole center (d-axis) of the rotor 12 and the center position in the circumferential direction of the convex portion 42 of the magnetizing yoke 41 match. Magnetization is performed by a magnetizing magnetic field generated by energizing each magnetizing coil 43. In this third step S23, the permanent magnet 22 is biased by the magnetic force of the magnet after magnetization so as to be close to the first side surface 23a on the radially inner side of both sides of the accommodation hole 23 in the radial direction.

Figure 12B:
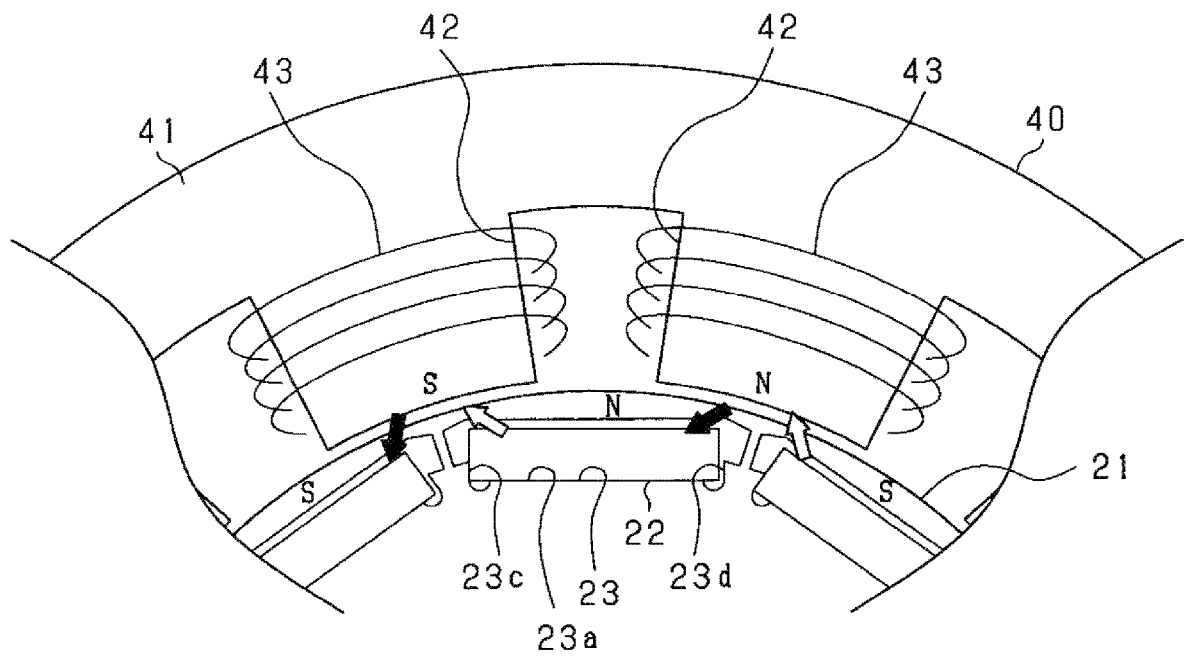
FIG. 12B is a diagram illustrating a magnetization and a biasing arrangement by a magnetizing device.

Furthermore, in the fourth step S24, the permanent magnets 22 are arranged to one side in the circumferential direction within the accommodation hole 23 by the external magnetic force generated from the magnetizing device 40. At this time, as shown in FIG. 12B, the rotor 12 is arranged so that the magnetic pole boundary (q-axis) of the rotor 12 and the center position in the circumferential direction of the convex portion 42 of the magnetizing yoke 41 match. The biasing arrangement of the permanent magnet 22 is performed in a biased manner by a biasing magnetic field generated by energization of each magnetizing coil 43. The external magnetic force generated from the magnetizing device 40 is a magnetic force directed toward one side (left direction in FIG. 12B) in the circumferential direction. Due to this external magnetic force, the permanent magnet 22 is biased so as to be close to one second side surface 23c in the circumferential direction. The third step S23 and the fourth step S24 correspond to a "biasing step".

In the fourth step S24, the magnetizing device 40 corresponds to a "biasing magnetic force device". In the third step S23 and the fourth step S24, the magnitude of the magnetic force generated by the magnetizing device 40 may be made different. Furthermore, when biasing the permanent magnet 22, it is also possible to generate external magnetic force using a magnetic force generating device (biasing magnetic force device) different from the magnetizing device used to magnetize the permanent magnet 22.

Thereafter, in a fifth step S25, the adhesive in the accommodation hole 23 is cured to fix the permanent magnet 22. As a result, the permanent magnet 22 is fixed at the same position in each of the accommodation holes 23 arranged in the circumferential direction. The fifth step S25 corresponds to a "fixing step".

According to the above manufacturing method, the variation in the position of the permanent magnet 22 is suppressed by using the magnet's own magnetic force and external magnetic force, so the complexity during manufacturing can be suppressed compared to, for example, a method using multiple types of adhesives. As a result, the permanent magnet 22 can be properly fixed within the accommodation hole 23 of the rotor core 21.

In the biasing step, the non-magnetized permanent magnet 22 inserted into the accommodation hole 23 is magnetized by the magnetizing device 40, and the external magnetic force of the biasing magnetic device causes the permanent magnet 22 to bias toward one side of the second side surfaces 23c on both sides in the circumferential direction. In this case, by continuously magnetizing and positioning the permanent magnets 22, the rotor 12 can be manufactured efficiently.

Other Embodiments

The above embodiment may be modified as follows, for example.

In the configuration shown in FIG. 3B, in the accommodation hole 23, the filler 24 is filled in the spaced apart region between the permanent magnet 22 and the rotor core 21, which is formed by biasing the divided magnets 22a and 22b in the radial direction and the circumferential direction. However, it is also possible to adopt a configuration in which the filler 24 is not filled. In this case, the rotor 12 has the following configurations. That is, in the accommodation hole 23 of each magnetic pole, the divided magnets 22a and 22b are accommodated in a state lined up in the circumferential direction. More specifically, the divided magnets 22a and 22b are biased in the radial direction so as to be close to the first side surface of the side having the thicker core thickness in the radial direction of both sides of the accommodation hole 23 in the radial direction, and are biased toward the second side surfaces 23c and 23d, respectively, in the circumferential direction.

In the rotor 12 of this configuration, as in the previously described embodiments, it is possible to suppress positional variations of the divided magnets 22a and 22b by using the magnetic force of the magnets themselves. Further, since a filler such as an adhesive or a resin material is not required, the manufacturing cost of the rotor 12 can be reduced. Even when torque is generated by the winding electromagnetic force of the stator 13 during use of the rotary electric machine 10, the magnetic attractive force and magnetic repulsive force of each of the divided magnets 22a, 22b are maintained, and the state in which each of the divided magnets 22a and 22b is biased on one side is maintained.

In each of the above embodiments, an example of application to the rotary electric machine having an inner rotor type IPM rotor has been described, but it is also possible to apply to a rotary electric machine having an outer rotor type IPM rotor.

Although the present disclosure has been described in accordance with the embodiments, it is understood that the present disclosure is not limited to the above embodiments or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

What is claimed is:

1. A rotor of a rotary electric machine, comprising:
a rotor core made of soft magnetic material;
a plurality of magnets each accommodated in a plurality of accommodation holes provided at predetermined intervals in a circumferential direction in the rotor core; and
a filler filled in the accommodation hole and for fixing the magnet, wherein
the rotor core has a radial core thickness that is different on one side and the other side in a radial direction with the accommodation hole in between,
the accommodation hole is formed surrounded by first side surfaces facing each other in a radial direction and second side surfaces facing each other in the circumferential direction,
the magnet is composed of two divided magnets arranged in the circumferential direction within the accommodation hole,
the two divided magnets are biased in the radial direction so as to be close to the first side surface on a side having a thicker radial core thickness among both radial sides of the accommodation hole, and are biased so as to be close to the second side surface on an opposite side from the other divided magnet in the circumferential direction, and in the accommodation hole, the filler is filled in a spaced apart region between the divided magnets and the rotor core, which is formed by biasing each of the divided magnets in the radial and circumferential directions.

2. The rotor of the rotary electric machine according to claim 1, wherein
each of the divided magnets is divided into two in an axial direction, and
the divided magnets arranged in the axial direction are spaced apart from each other in the accommodation hole, and the spaced apart region is filled with the filler.

3. The rotor of the rotary electric machine according to claim 1, wherein
in the two divided magnets, a radial thickness dimension on a d-axis side, which is a magnetic pole center, is larger than a radial thickness dimension on a q-axis side, which is a magnetic pole boundary.

4. A rotor of a rotary electric machine, comprising:
a rotor core made of soft magnetic material; and
a plurality of magnets each accommodated in a plurality of accommodation holes provided at predetermined intervals in a circumferential direction in the rotor core; wherein
the rotor core has a radial core thickness that is different on one side and the other side in a radial direction with the accommodation hole in between,
the accommodation hole is formed surrounded by first side surfaces facing each other in the radial direction and second side surfaces facing each other in the circumferential direction,
the magnet is composed of two divided magnets arranged in the circumferential direction within the accommodation hole,
the two divided magnets are biased in the radial direction so as to be close to the first side surface on a side having a thicker radial core thickness among both radial sides of the accommodation hole, and are biased so as to be close to the second side surface on an opposite side from the other divided magnet in the circumferential direction.

* * * * *